United States Patent
Gresch et al.

(10) Patent No.: US 10,631,464 B2
(45) Date of Patent: Apr. 28, 2020

(54) AGRICULTURAL UTILITY VEHICLE HAVING A POWER TAKEOFF AND METHOD FOR OPERATING THE POWER TAKEOFF

(71) Applicant: Deere & Company, Moline, IL (US)

(72) Inventors: Valentin Gresch, Ensheim (DE); Martin Kremmer, Mannheim (DE)

(73) Assignee: Deere & Company, Moline, IL (US)

( * ) Notice: Subject to any disclaimer, the term of this patent is extended or adjusted under 35 U.S.C. 154(b) by 145 days.

(21) Appl. No.: 15/794,623

(22) Filed: Oct. 26, 2017

(65) Prior Publication Data

US 2018/0116125 A1 May 3, 2018

(30) Foreign Application Priority Data

Oct. 28, 2016 (DE) .......................... 10 2016 221 311

(51) Int. Cl.
| | | |
|---|---|---|
| *A01F 15/08* | (2006.01) | |
| *B60K 17/28* | (2006.01) | |
| *B60K 25/06* | (2006.01) | |
| *B60R 16/03* | (2006.01) | |

(52) U.S. Cl.
CPC .......... *A01F 15/0841* (2013.01); *B60K 17/28* (2013.01); *B60K 25/06* (2013.01); *B60R 16/03* (2013.01); *B60Y 2200/221* (2013.01)

(58) Field of Classification Search
CPC ...... A01F 15/0841; B60K 17/28; B60K 25/06
See application file for complete search history.

(56) References Cited

U.S. PATENT DOCUMENTS

| 6,048,288 | A * | 4/2000 | Tsujii | B60H 1/3222 477/5 |
|---|---|---|---|---|
| 8,115,334 | B2 * | 2/2012 | Vyas | B60K 6/46 307/10.1 |
| 8,672,066 | B2 * | 3/2014 | Momal | B60K 6/38 180/53.8 |
| 8,996,214 | B2 * | 3/2015 | Ishii | B60K 6/485 701/22 |
| 2004/0204276 | A1 * | 10/2004 | Tarasinski | A01B 71/06 475/5 |
| 2009/0018716 | A1 * | 1/2009 | Ambrosio | B60K 6/48 701/22 |

(Continued)

FOREIGN PATENT DOCUMENTS

| DE | 10 2009 046 973 A1 | 5/2011 |
|---|---|---|
| DE | 10 2012 006 731 A1 | 10/2013 |

(Continued)

OTHER PUBLICATIONS

European Search Report issued in counterpart application No. 17198300.0 dated Feb. 19, 2018. (7 pages).

(Continued)

*Primary Examiner* — Ruth Ilan

(57) ABSTRACT

An agricultural utility vehicle includes a working power takeoff drivable by means of an internal combustion engine for operating an implement. The utility vehicle further includes an auxiliary power takeoff, which can be driven by an energy storage device and is coupled to the working power takeoff in such a manner that the working power takeoff is additionally driven at least transiently by the auxiliary power takeoff.

19 Claims, 2 Drawing Sheets

(56) References Cited

U.S. PATENT DOCUMENTS

| | | | |
|---|---|---|---|
| 2010/0115902 A1 | 10/2010 | Schlesser et al. | |
| 2014/0026691 A1 * | 1/2014 | Huber | B60W 30/1888 |
| | | | 74/15.86 |
| 2016/0046278 A1 * | 2/2016 | Matsuzaki | B60L 58/13 |
| | | | 701/22 |

FOREIGN PATENT DOCUMENTS

| | | | | |
|---|---|---|---|---|
| DE | 102012213278 A1 | 1/2014 | | |
| DE | 10 2014 113 613 A1 | 3/2016 | | |
| DE | 10 2015 115 649 A1 | 3/2017 | | |
| EP | 1273218 A1 * | 1/2003 | | A01B 51/04 |
| EP | 2929776 A1 * | 10/2015 | | A01F 15/0841 |
| EP | 2998167 A1 | 3/2016 | | |
| EP | 3105076 A2 | 12/2016 | | |
| GB | 2493961 * | 2/2013 | | B60K 17/28 |
| WO | 20110138 308 A1 | 11/2011 | | |
| WO | WO-2016005334 A1 * | 1/2016 | | A01F 15/0841 |

OTHER PUBLICATIONS

German Search Report issued in counterpart application No. DE 10 2016 221 311.3 dated Mar. 8, 2017 (12 pages).

* cited by examiner

AGRICULTURAL UTILITY VEHICLE HAVING A POWER TAKEOFF AND METHOD FOR OPERATING THE POWER TAKEOFF

RELATED APPLICATIONS

This application claims priority to German Application Ser. No. 102016221311.3, filed Oct. 28, 2016, the disclosure of which is hereby expressly incorporated by reference in its entirety.

FIELD OF THE DISCLOSURE

The present disclosure relates to an agricultural utility vehicle having a power takeoff for operating an implement. The method further relates to a method for driving a power takeoff of an agricultural utility vehicle.

BACKGROUND

A work system consisting of a tractor and a square baler is known from U.S. Publication Ser. No. 2010/0115902A1. The square baler is driven via a power takeoff of the tractor. The rear power takeoff is in turn driven via a gear unit by the internal combustion engine of the tractor. The output torque of the internal combustion engine is modified depending on the determined load data from the square baler.

The invention addresses the problem of driving a power takeoff of an agricultural vehicle in an energy-efficient manner for operating an implement with low expense.

SUMMARY

In one embodiment of the present disclosure, an agricultural utility vehicle (e.g. a traction vehicle or a tractor) has an internal combustion engine which, in particular by means of a suitable clutch, gear stage or the like, drives a power takeoff of the utility vehicle. This power takeoff (hereinafter "working power takeoff") in turn operates, with its kinetic energy, an implement (e.g., a big baler). The utility vehicle additionally includes a further power takeoff (hereinafter "auxiliary power takeoff") that can be driven by the stored energy and energy storage device. It is provided that the auxiliary power takeoff is coupled to the working power takeoff in such a manner that the working power takeoff can be driven not only by the internal combustion engine, but also by the auxiliary power takeoff, at least transiently.

In this manner, discrete or cyclically occurring peak loads of the implement, which are transmitted via the gear unit thereof to the working power takeoff of the utility vehicle, can be compensated at the working power takeoff by additionally driving it transiently with the auxiliary power takeoff. Thereby, conventional effects when operating the implement, such as a drop in the rotational speed of the internal combustion engine and the speed of the utility vehicle when torque or load peaks occur at the working power takeoff, can be reduced or completely eliminated in a technically simple manner. This supports the internal combustion engine of the utility vehicle and a uniform working operation for the implement. It is also possible to operate the internal combustion engine in a virtually stationary state, whereby a corresponding reduction of the fuel consumption or emission values is achieved.

The term "at least transiently" includes defined or predetermined times or periods of time in which the auxiliary power takeoff is driven by the energy storage device and is drivingly coupled to the working power takeoff. At these times or in these periods of time, the auxiliary power takeoff is then in an assistance mode for assisting the rotational driving of the working power takeoff.

Depending on the respective embodiment of the utility vehicle and the gear stages between the internal combustion engine and the power takeoffs, the auxiliary power takeoff can be driven under certain operating conditions by the internal combustion engine or the working power takeoff if the auxiliary power takeoff is not in the above-mentioned assistance mode thereof. It is also possible in principle for the working power takeoff and the auxiliary power takeoff to be driven independently of one another and, when necessary (e.g., during an assistance mode), coupled to one another in a defined manner.

In order for the auxiliary power takeoff to be able to efficiently assist the working power takeoff, an energy storage device is designed as a device that enables storage and regulated or controlled output of energy to the auxiliary power takeoff.

The energy storage device supplies the auxiliary power takeoff with kinetic energy if an elevated load torque or a load torque peak is acting on the working power takeoff.

In principle, an energy accumulator of the energy storage device can be implemented in different manners. For example, electrical energy storage, mechanical energy storage (e.g., by means of a spring mechanism) or hydraulic energy storage (e.g., by means of a pressure accumulator) are conceivable.

In another embodiment, the energy storage device has an energy accumulator that stores energy generated by the auxiliary power takeoff itself (other than in assistance mode). This avoids expensive additional energy sources on the utility vehicle and supports the energy-saving character in the desired assistance of the working power takeoff by the auxiliary power takeoff.

The energy storage device has a flywheel mass. The flywheel mass can store energy and then output it. In particular, the flywheel mass is designed as a flywheel. For an efficient usage of the flywheel mass, it can be simply connected to the auxiliary power takeoff. When the auxiliary power takeoff is coupled to the working power takeoff in the assistance mode, the flywheel mass of the auxiliary power takeoff supplements the drive torque of the working power takeoff and thus the working energy of the implement (e.g., a flywheel mass of the implement). In comparison to a correspondingly larger flywheel mass on the implement, the flywheel mass on the auxiliary power takeoff has the advantage that the total drive torque is less because the working power takeoff and the auxiliary power takeoff are coupled to one another only to compensate for load peaks on the working power takeoff.

In another embodiment, the energy storage device has an electrical energy storage unit. It may it be designed, for example, as a super-capacitor.

It is advantageous in this regard to connect the electrical energy storage unit to an electrical machine that is coupled to the auxiliary power takeoff. The electrical machine has at least one motor function and can output electrical energy from the energy storage unit as kinetic energy to the auxiliary power takeoff.

The electrical machine advantageously also has a generator function so that kinetic energy produced by the auxiliary power takeoff outside of assistance mode can be stored as electrical energy and output again as kinetic energy to the auxiliary power takeoff when necessary. In this way, the electrical machine can be actuated to perform a motor or generator function depending on operating information from the implement. This may be derived, for example, from the temporally expected load torques at the working power takeoff.

The working power takeoff is designed as a rear-end power takeoff and the auxiliary power takeoff as a front-end power takeoff. In particular, the energy storage device can be removable so that it can be mounted optionally at the front or rear power takeoff acting as the working power takeoff, in which case the respective other power takeoff constitutes the auxiliary power takeoff.

The energy storage device is advantageously arranged mechanically stably in a three-point hitch available as standard on the utility vehicle. In addition, the distance between the auxiliary power takeoff and the energy storage device can be kept small and any losses in energy transmission between the two parts can be negligible.

The method for driving a working power takeoff of an agricultural utility vehicle presumes that an internal combustion engine of the utility vehicle drives the power takeoff of the utility vehicle, and in particular, via a suitable clutch, gear stage or the like.

In one embodiment of a method in this disclosure, an item of operating information (e.g., pressing force, implement status, pressing piston position, etc.) of the active or operating implement is determined. Depending on the operating information, a time or period of time is defined in which a further power takeoff, or an auxiliary power takeoff, of the utility vehicle is coupled to the working power takeoff such that the working power takeoff is additionally driven by the auxiliary power takeoff, the auxiliary power takeoff being supplied for this purpose with kinetic energy from an energy storage device. At defined or predetermined times or periods of time, the auxiliary power takeoff is thus in an assistance mode for assisting the rotary driving of the working power takeoff. With regard to the advantages of this assistance mode (such as compensating for peak loads appearing at the working power takeoff, reducing or avoiding decreasing the rotational speed of the internal combustion engine and the speed of the utility vehicle when torque or load peaks occur at the working power takeoff, etc.), the reader is referred to the above explanations.

The above-mentioned assistance mode of the auxiliary power takeoff is used with a big baler as the implement. When the big baler is active, heavy cyclical peak loads are caused by the pressing piston and are transmitted via the gear unit of the baler to the working power takeoff of the utility vehicle. The torque peaks of the working power takeoff resulting from this can be compensated in the assistance mode of the auxiliary power takeoff.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
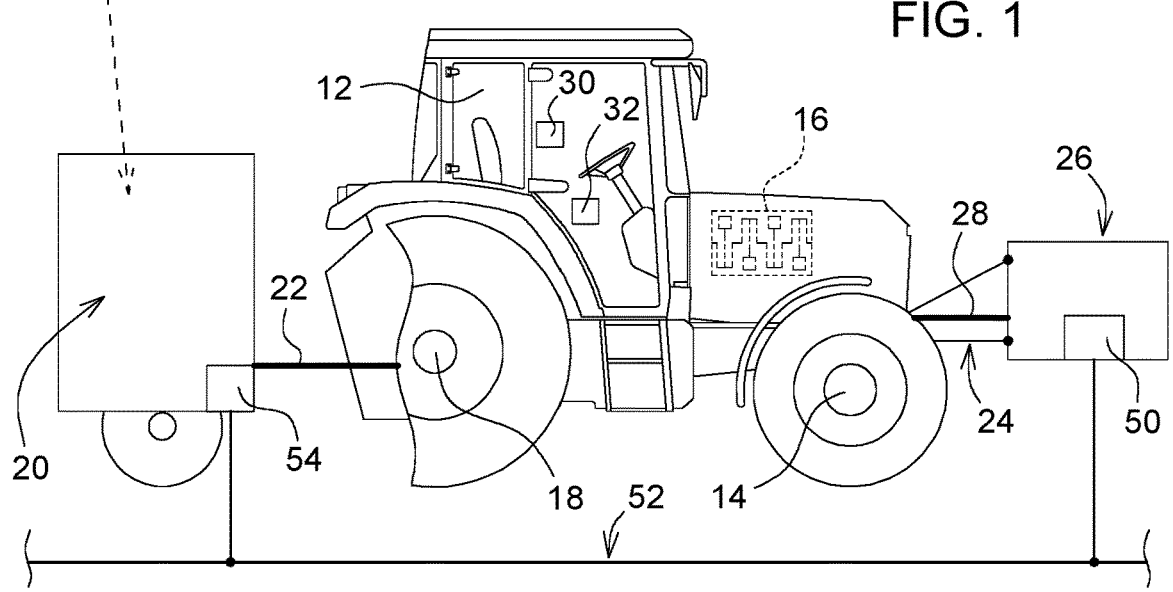
FIG. 1 shows an agricultural utility vehicle with a schematically illustrated implement at its rear.

In FIG. 1, an embodiment of an agricultural utility vehicle 10 is in the form of a tractor having a cab, a front axle 14, and an internal combustion engine 16 for driving at least a rear axle 18. An implement 20 is operated with respect to its working function by means of a rear power takeoff (hereinafter working power takeoff 22) and is present at the rear area of the utility vehicle 10. A front three-point hitch 24, which supports a removable energy supply device 26, is present at the front end of the utility vehicle 10. The energy storage device 26 has the purpose of driving a front power takeoff (hereinafter auxiliary power takeoff 28).

In the region of the cab 12 there is an operating element 30 for activating and deactivating the working power takeoff 22 and an operating element 32 for activating and deactivating the auxiliary power takeoff 28, among other things. In addition, an appropriate transmission ratio can be preselected and the power takeoff rotational speed can be limited by means of the operating elements 30, 32.

Figure 2:
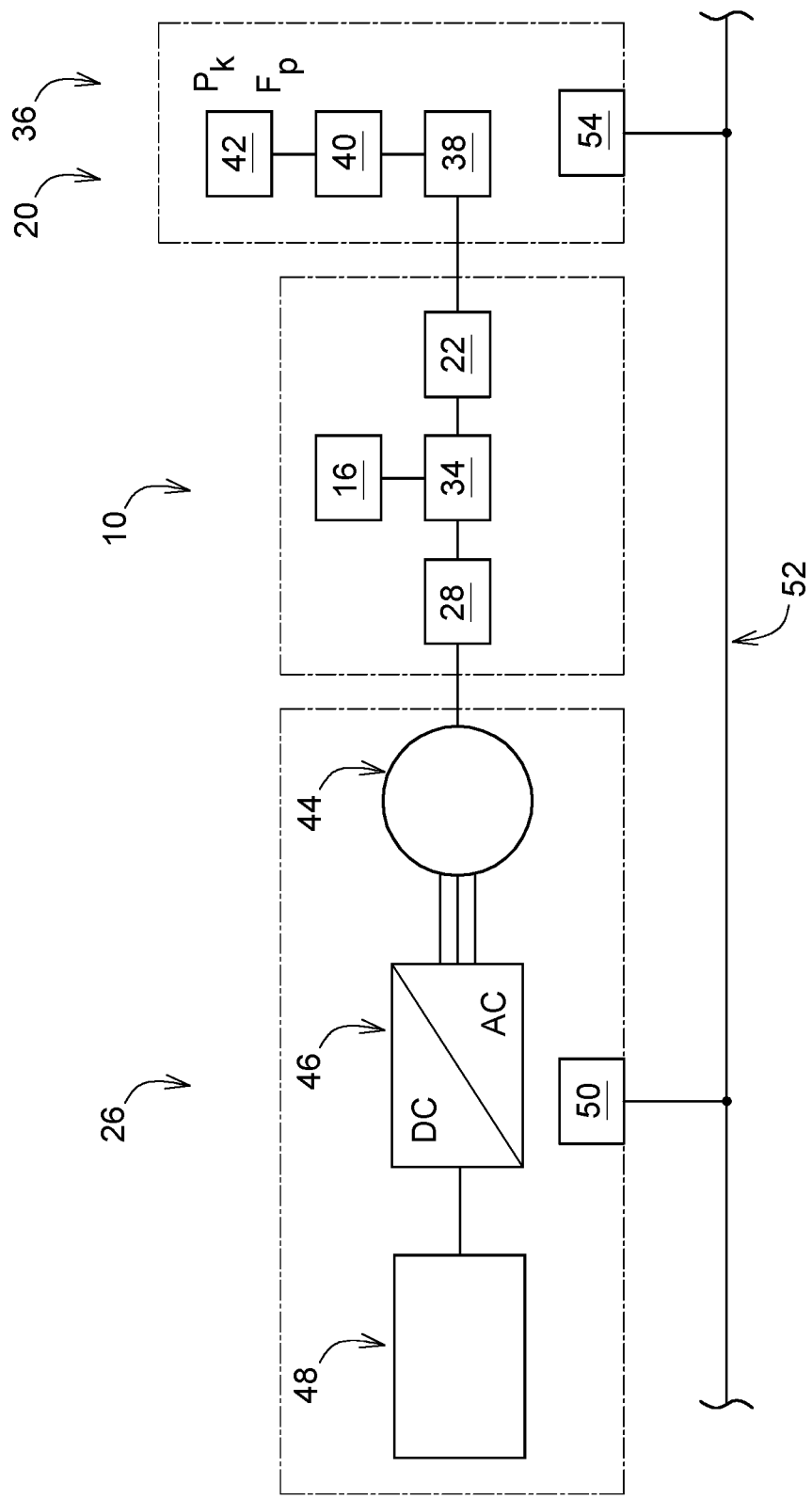
FIG. 2 shows a schematic-like representation of a working system consisting of the utility vehicle and the implement of FIG. 1.

FIG. 2 schematically shows individual details of the interaction of the utility vehicle 10 with the implement 20. The two power takeoffs 22, 28 can be driven by a suitable gearbox device 34 and the drivetrain of the utility vehicle independently of one another by the internal combustion engine 16.

The auxiliary power takeoff 28 can additionally be coupled via the gearbox device 34 to the working power takeoff 22 in such a manner that the auxiliary power takeoff 28 simply runs at the speed of the working power takeoff 22, which is achieved by the driving of the working power takeoff 22 by the internal combustion engine 16. In addition, the auxiliary power takeoff 28 can be coupled in an assistance mode to the working power takeoff 22 in such a manner that, at defined times or periods of time, the working power takeoff 22 is not driven only by the internal combustion engine 16, but also by the auxiliary power takeoff 28, in order to compensate for elevated load torques or load torque peaks at the working power takeoff 22.

In FIG. 2, an implement 20 in the form of a large baler 36 is operated by means of the working power takeoff 22. The big baler 36 includes a flywheel 38 which, optionally via intervening additional components for transmitting force, is drivingly coupled to the working power takeoff 22. A pressing gear unit 40, which operates a pressing piston 42, is connected to the flywheel 38. Depending on the design, additional components for force transmission (not shown) can be provided between the flywheel 38, the pressing gear unit 40 and the pressing piston 42.

The energy storage device 26 according to FIG. 2 contains an alternating current machine 44 that can be used as a motor and a generator, an AC/DC converter 46, an energy storage unit 48 designed as a super-capacitor, and a control unit 50. The control unit 50 is connected via a data bus 52 of the utility vehicle 10 to a control unit 54 of the implement 20 or the large baler 36. In this way, the control unit 50 of the energy storage device 26 can receive data and information regarding expected load cycles of the implement 20 or the large baler 36. The energy storage device can be controlled in such a manner that the alternating current machine 44 is active as a generator during a low-load period of time (e.g., with torques M of approximately $M_N$), so that mechanical energy available at the auxiliary power takeoff is stored as electrical energy in the energy storage unit 48. During the elevated load or peak load generated by the implement 20 or the large baler 36 (e.g., in the period $t_1$ to $t_2$), the alternating current machine 44 operates as a motor and outputs the stored energy back to the auxiliary power takeoff 28, which thereby additionally drives the drive shaft 22 in an assistance mode. The control unit 50 regulates the torque of the alternating current machine 44 operating as a motor, based on received or determined predictive load information from the implement 20 or the large baler 36.

Due to the pressing piston 42 in the large baler 36, high cyclical peak loads, i.e., torques M that are greater than a low-load torque $M_N$ and can reach a peak torque $M_S$ (see schematic diagram in FIG. 1) are generated and can be transmitted via the pressing gear unit 40 to the working power takeoff 22 of the utility vehicle 10. This can lead to a decrease of the rotational speed of the internal combustion engine 16 and a decrease of the forward speed of the utility vehicle 10 in working operation. In order to compensate for the elevated loads or peak loads, the working power takeoff 22 is additionally driven by the auxiliary power takeoff 28 at defined times or periods of time (e.g., $t_S$, or $t_1$ to $t_2$). For this purpose, an information item of the active big baler 36 is determined in the embodiment according to FIG. 2. This operating information item can be a position $P_K$ and a pressing force $F_P$ of the pressing piston 42, for example. On the basis of this information, predictive load information is determined, particularly a load torque M to be expected or a load peak $M>M_N$ and the associated time $t_1$, $t_S$, $t_2$ or time period $t_1$ to $t_2$. It is thereby possible to define times or periods of time in which the auxiliary power takeoff 28 is coupled to the working power takeoff 22 and supplied with kinetic energy in such a manner that the working power takeoff 22 is additionally driven by the auxiliary power takeoff 28.

Figure 3:
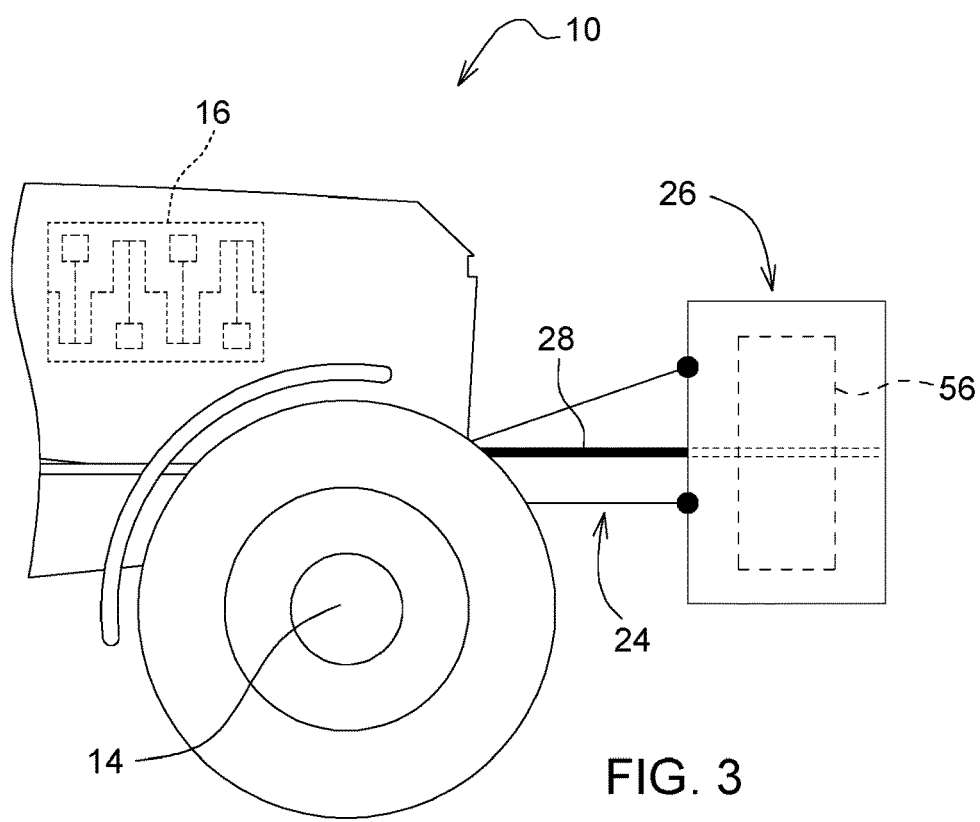
FIG. 3 shows the front region of the utility vehicle of FIG. 1.

While the energy storage device 26 according to FIG. 2 can be considered an electrically active flywheel mass or electrically active flywheel, the energy storage device 26 in the embodiment of FIG. 3 has a mechanical flywheel mass 56 that is connected to the auxiliary power takeoff 28.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agriculture utility vehicle, comprising:
an internal combustion engine;
an implement operably connected to the rear of the vehicle;
an energy storage device operably connected to the front of the vehicle;
a rear working power takeoff operably coupled to the internal combustion engine and the energy storage device; and
a front auxiliary power takeoff operably coupled to the energy storage device and the internal combustion engine;
wherein in a first mode, the internal combustion engine drives the rear working power takeoff to operate the implement and the front auxiliary power takeoff to provide energy to the energy storage device;
wherein in a second mode, the internal combustion engine drives the rear working power takeoff to operate the implement, and the energy storage device drives the front auxiliary power takeoff to provide additional power to the rear working power takeoff for the implement.

2. The vehicle of claim 1, wherein the front auxiliary power takeoff is operably functional as an additional drive during an elevated load torque or during a load torque peak at the working power takeoff.

3. The vehicle of claim 1, wherein the energy storage device comprises an energy storage unit for storing kinetic energy from the front auxiliary power takeoff.

4. The vehicle of claim 3, wherein the energy storage device comprises a flywheel mass.

5. The vehicle of claim 1, wherein the energy storage device comprises an electrical energy storage unit.

6. The vehicle of claim 5, wherein the energy storage device comprises an electrical machine operably connected to the electrical energy storage unit and the auxiliary power takeoff.

7. The vehicle of claim 6, wherein the electrical machine comprises a motor function and a generator function.

8. The vehicle of claim 1, wherein the energy storage device is arranged on or in a front three-point hitch.

9. The vehicle of claim 1, wherein the implement is designed as a large baler.

10. A method for driving a rear working power takeoff of an agricultural utility vehicle, comprising:
providing an internal combustion engine, an implement connected to the rear of the agricultural utility vehicle, an energy storage device connected to the front of the agricultural utility vehicle, and a front auxiliary power takeoff;
operably driving the rear working power takeoff by the internal combustion engine;
operably driving the front auxiliary power takeoff by the internal combustion engine to power the energy storage device;
controllably operating the implement by the rear working power takeoff;
operably driving the front auxiliary power takeoff by the energy storage device;
coupling the rear working power takeoff to the front auxiliary power takeoff; and
at least partially driving the rear working power takeoff in a transient manner by the front auxiliary power takeoff to provide additional power for the implement.

11. The method of claim 10, further comprising:
determining an operating information item of the implement in operation; and
depending on the operating information item, defining a time or a period of time in which the rear working power takeoff is operably driven by the front auxiliary power takeoff.

12. The method of claim 10, wherein the implement is designed as a large baler.

13. The method of claim 10, wherein the front auxiliary power takeoff is operably functional as an additional drive during an elevated load torque or during a load torque peak at the working power takeoff.

14. The method of claim 10, wherein the energy storage device comprises an energy storage unit for storing kinetic energy from the auxiliary power takeoff.

15. The method of claim 14, wherein the energy storage device comprises a flywheel mass.

16. The method of claim 10, wherein the energy storage device comprises an electrical energy storage unit.

17. The method of claim 16, wherein the energy storage device comprises an electrical machine operably connected to the electrical energy storage unit and the auxiliary power takeoff.

18. The method of claim 17, wherein the electrical machine comprises a motor function and a generator function.

19. The method of claim 10, wherein the energy storage device is arranged on or in a front three-point hitch.

* * * * *